US009626531B2

(12) United States Patent
Natarajan et al.

(10) Patent No.: US 9,626,531 B2
(45) Date of Patent: Apr. 18, 2017

(54) SECURE CONTROL OF SELF-ENCRYPTING STORAGE DEVICES (71) Applicant: Intel Corporation, Santa Clara, CA (US)

(72) Inventors: Shankar Natarajan, Santa Clara, CA (US); Jason Cox, Longmont, CO (US); Charles B. Foster, Roseville, CA (US); Hinesh K. Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 14/543,935

(22) Filed: Nov. 18, 2014

(65) Prior Publication Data

US 2016/0140364 A1 May 19, 2016

(51) Int. Cl.
*G06F 12/14* (2006.01)
*G06F 21/78* (2013.01)
(Continued)

(52) U.S. Cl.
CPC ............ *G06F 21/78* (2013.01); *G06F 21/604* (2013.01); *G06F 21/6245* (2013.01);
(Continued)

(58) Field of Classification Search
CPC ................. G11B 20/0021; G06F 21/78; G06F 2221/2153; G06F 21/31; G06F 21/6245;
(Continued)

(56) References Cited

U.S. PATENT DOCUMENTS 5,375,243 A * 12/1994 Parzych .................. G06F 21/34
380/52
7,036,020 B2 * 4/2006 Thibadeau ............ G06F 21/805
713/189
(Continued)

FOREIGN PATENT DOCUMENTS

EP          1519276          3/2005

OTHER PUBLICATIONS

Seagate Technology, LLC. "Seagate Secure TCG Enterprise SSC Pulsar.2 Self-Encrypting Drive: FIPS 140 Module Security Policy", Nov. 2012.*

(Continued)

*Primary Examiner* — Michael Simitoski
(74) *Attorney, Agent, or Firm* — Grossman, Tucker, Perreault & Pfleger, PLLC (57) ABSTRACT Generally, this disclosure provides systems, devices, methods and computer readable media for secure control of access control enablement and activation on self-encrypting storage devices. In some embodiments, the device may include a non-volatile memory (NVM) and a secure access control module. The secure access control module may include a command processor module configured to receive a request to enable access controls of the NVM from a user, and to enable the access controls. The secure access control module may also include a verification module configured to verify a physical presence of the user. The secure access control module may further include an encryption module to encrypt at least a portion of the NVM in response to an indication of success from the verification module.

19 Claims, 5 Drawing Sheets (51) Int. Cl.
*G06F 21/62* (2013.01)
*G11B 20/00* (2006.01)
*G06F 21/60* (2013.01)
*G06F 21/00* (2013.01)
*H04L 9/32* (2006.01)

(52) U.S. Cl.
CPC .... *G11B 20/0021* (2013.01); *G06F 2212/402* (2013.01); *G06F 2221/2111* (2013.01)

(58) Field of Classification Search
CPC .......... G06F 2212/402; G06F 12/1408; H04L 9/3234; H04L 9/0897; H04L 63/0861
See application file for complete search history.

(56) References Cited

U.S. PATENT DOCUMENTS

| | | | | |
|---|---|---|---|---|
| 7,690,030 | B1* | 3/2010 | Ma | G06F 12/1416 |
| | | | | 713/172 |
| 7,783,281 | B1* | 8/2010 | Cook | G06F 21/88 |
| | | | | 455/410 |
| 2004/0123127 | A1* | 6/2004 | Teicher | G06F 21/78 |
| | | | | 713/193 |
| 2007/0180210 | A1* | 8/2007 | Thibadeau | G06F 12/1458 |
| | | | | 711/163 |
| 2007/0250710 | A1* | 10/2007 | Thibadeau | H04L 9/0838 |
| | | | | 713/168 |
| 2009/0113207 | A1 | 4/2009 | Dolgunov et al. | |
| 2009/0292926 | A1* | 11/2009 | Daskalopoulos | G06F 21/10 |
| | | | | 713/176 |
| 2010/0037319 | A1* | 2/2010 | Steeves | G06F 21/31 |
| | | | | 726/23 |
| 2010/0050244 | A1* | 2/2010 | Tarkhanyan | G06F 21/57 |
| | | | | 726/7 |
| 2010/0106928 | A1* | 4/2010 | Toda | G06F 12/1458 |
| | | | | 711/163 |
| 2010/0161927 | A1* | 6/2010 | Sprouse | G06F 21/36 |
| | | | | 711/163 |
| 2010/0185843 | A1* | 7/2010 | Olarig | G06F 21/6218 |
| | | | | 713/2 |
| 2011/0087898 | A1* | 4/2011 | Williams | G06F 21/31 |
| | | | | 713/193 |
| 2011/0093958 | A1* | 4/2011 | Devictor | G06F 21/6218 |
| | | | | 726/26 |
| 2011/0150266 | A1 | 6/2011 | Hohndel | |
| 2011/0258456 | A1* | 10/2011 | Lyakhovitskiy | G06F 21/78 |
| | | | | 713/189 |
| 2011/0307709 | A1* | 12/2011 | Cox | G06F 21/80 |
| | | | | 713/183 |
| 2012/0254602 | A1* | 10/2012 | Bhansali | G06F 21/575 |
| | | | | 713/2 |
| 2013/0067242 | A1* | 3/2013 | Lyakhovitskiy | G06F 21/00 |
| | | | | 713/193 |
| 2013/0283381 | A1* | 10/2013 | Thadikaran | G06F 21/56 |
| | | | | 726/23 |
| 2013/0318358 | A1 | 11/2013 | Wang et al. | |
| 2014/0130188 | A1* | 5/2014 | Baryudin | G06F 21/78 |
| | | | | 726/29 |

OTHER PUBLICATIONS

Seagate Technology, LLC. "Seagate Secure TCG Opal SSC Self-Encrypting Drive: FIPS 140-2 Module Security Policy Security Level 2", Jul. 2012.*
Seagate Technology, LLC. "Seagate Ultra Mobile SSHD", May 2014.*
TCG. "TCG Storage Security Subsystem Class: Opal Specification Version 2.00 Revision 1.00", Feb. 2012.*
TCG. "TCG Storage Architecture Core Specification Specification Version 2.00 Revision 2.00", Nov. 2011.*
TCG. "TCG Storage Security Subsystem Class: Enterprise Specification Version 1.00 Final Revision 3.00", Jan. 2011.*
TCG, "TCG Storage Application Note: Encrypting Drives Compliant with Opal SSC," Feb. 19, 2010, 92 pages, Specification Version 1.00 Final, Revision, 1.00, Trusted Computing Group, Incorporated.
International Search Report and Written Opinion from related application PCT/US2015/056241, dated Mar. 25, 2016.
Taiwanese Office Action and Search Report issued in Taiwanese Application No. 104132857, dated Nov. 29, 2016, with English translation of Search Report.

* cited by examiner

SECURE CONTROL OF SELF-ENCRYPTING STORAGE DEVICES

FIELD

The present disclosure relates to self-encrypting storage devices, and more particularly, to self-encrypting storage devices with secure control of access control enablement and activation.

BACKGROUND

Storage drives, for example solid state drives (SSDs) or hard disk drives (HDDs), are often configured to provide security features including self-encryption and access control. These security features are designed to prevent a data breach in the event of physical loss or theft of the storage drive or the device containing the drive.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Security features provided by storage devices may typically be enabled or disabled by the manufacturer in a fixed manner. It would generally be desirable, however, to provide a capability that allows the end user to enable or disable these types of security features, for example through a software configurable device setting, without compromising the integrity of the drive. This would avoid the requirement for a user to purchase different devices depending on their security needs and simplify the logistics for manufacturers and suppliers who would otherwise need to manage separate product lines. Providing a user enable/disable capability, however, may present a security threat since a malicious attacker could potentially enable the security feature remotely and take ownership of the drive by setting new access control authentication credentials. This would lock out the legitimate user, who may not even be aware that security is enabled on the drive.

Generally, this disclosure provides systems, devices, methods and computer readable media for secure control of access control enablement and activation on self-encrypting storage devices. In one embodiment, the storage device may include a non-volatile memory (NVM) and a secure access control module. The secure access control module may be configured to process commands received from a user or host system including a request to enable access controls of the NVM. The secure access control module may further be configured to verify a physical presence of the user. Physical presence of the user may be verified by requiring the user to provide the Physical Security Identifier (PSID) associated with the storage device, which can generally be obtained in a limited manner, such as, for example, by reading a physical label on the storage device. The secure access control module may further be configured to allow the user to activate and provision access controls if the physical presence verification is successful and after a revert operation is performed.

The secure access control module may further include an encryption module configured to encrypt at least a portion of the NVM when access controls have been activated. The NVM may include or otherwise be configured as a Solid State Drive (SSD) or magnetic disk in a Hard Disk Drives (HDD). Any suitable method of encryption may be used including, for example, the Advanced Encryption Standard (AES), the Data Encryption Standard (DES) and the International Data Encryption Algorithm (IDEA). In some embodiments, the enablement of access controls may be considered an initialization or set-up activity of the storage device, to be performed by the user/owner of the storage device during an initial phase of deployment.

As used herein, the terms "enablement," "activation," and "provisioning," with respect to access controls, are defined as follows. Regarding "enablement," the access control capabilities of the device may be supported (embedded in hardware or software of the device, by the manufacturer) but remain in a disabled or hidden state until enablement is performed. After a successful enablement, activation may be performed to turn on the access controls so that portions of the NVM are encrypted or otherwise locked for security. Activation may also be accompanied by provisioning which is an operation to configure the access controls (e.g., provide additional authentication credentials for administrators and/or users and specify regions of the NVM for encryption, etc.).

Figure 1:
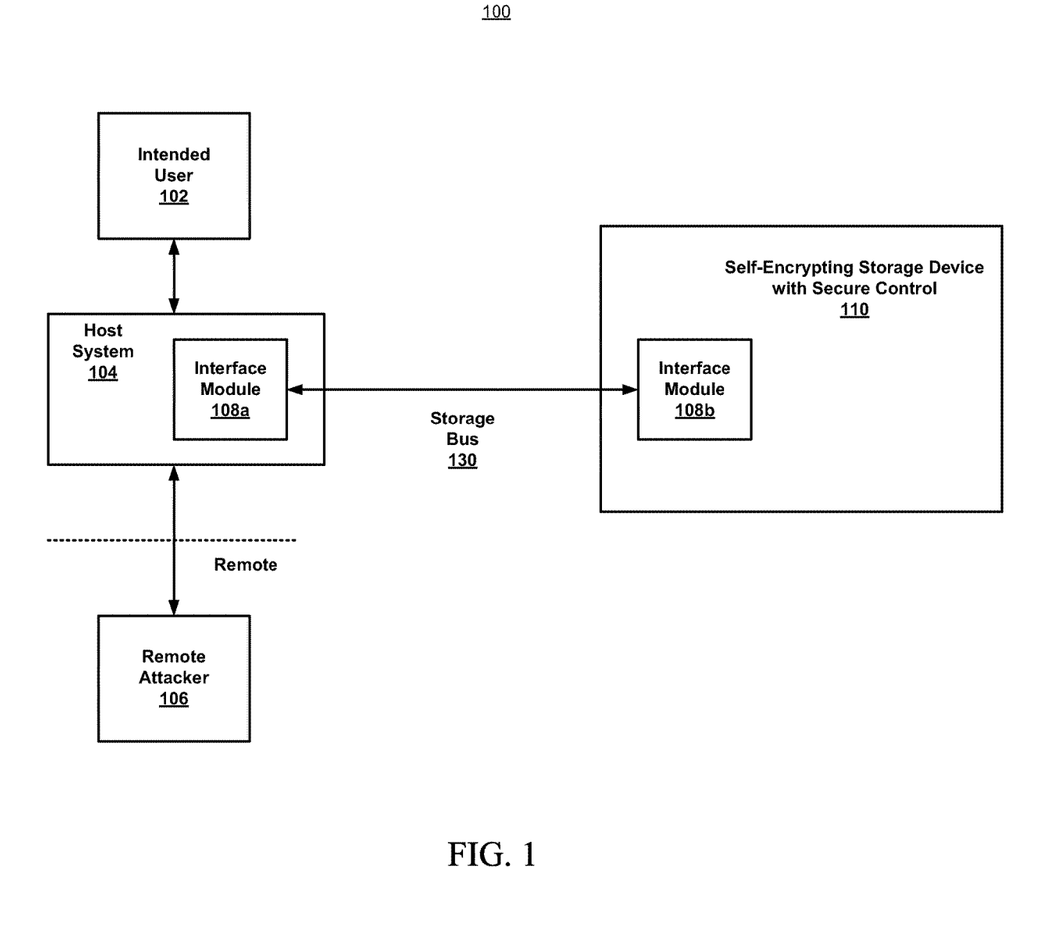
FIG. 1 illustrates a top level system diagram of an example embodiment consistent with the present disclosure.

FIG. 1 illustrates a top level system diagram 100 of one example embodiment consistent with the present disclosure. A host system 104 is shown coupled to a self-encrypting storage device with secure control capability 110. The secure control capability of the storage device will be described in greater detail below. In some embodiments, the host system 104 may be, for example, a desktop computer, workstation, laptop computer, convertible tablet, notebook, smart phone, smart tablet, personal digital assistant (PDA) or mobile Internet device (MID).

The host system 104 may be coupled to the storage device 110 through interface modules 108a, 108b and storage bus 130, which may be configured as a Serial Advanced Technology Attachment (SATA) interface, a Serial Attached Small Computer System (SAS) Interface or a Peripheral Component Interconnect Express (PCIe) interface, a Universal Flash Storage (UFS) interface, an embedded Multimedia Controller interface (eMMC) or any other suitable type of interface. The SATA and SAS interfaces may comply with ANSI standards managed by T13 (www.t13.org) and T10 (www.t10.org) technical committees. The PCIe interface may comply with the PCISIG standard (www.pcisig-.com). The UFS and eMMC may comply with the JEDEC standards (www.jedec.org). The storage device 110 described in this disclosure may be configured as a solid state drive (SSD). In some embodiments, the storage device 110 may include hard disk drive (HDD).

An intended or legitimate user 102 may access the storage device 110 through the host system 104 and interface 108 and bus 130. Similarly, a remote attacker or malicious user 106 may attempt to access the storage device 110 and attempt to enable access controls (and self-encryption of the device) to the detriment of the intended user 102. The secure control capability of the storage device 110 may be configured, however, to defeat such attempts, as will be described below.

Figure 2:
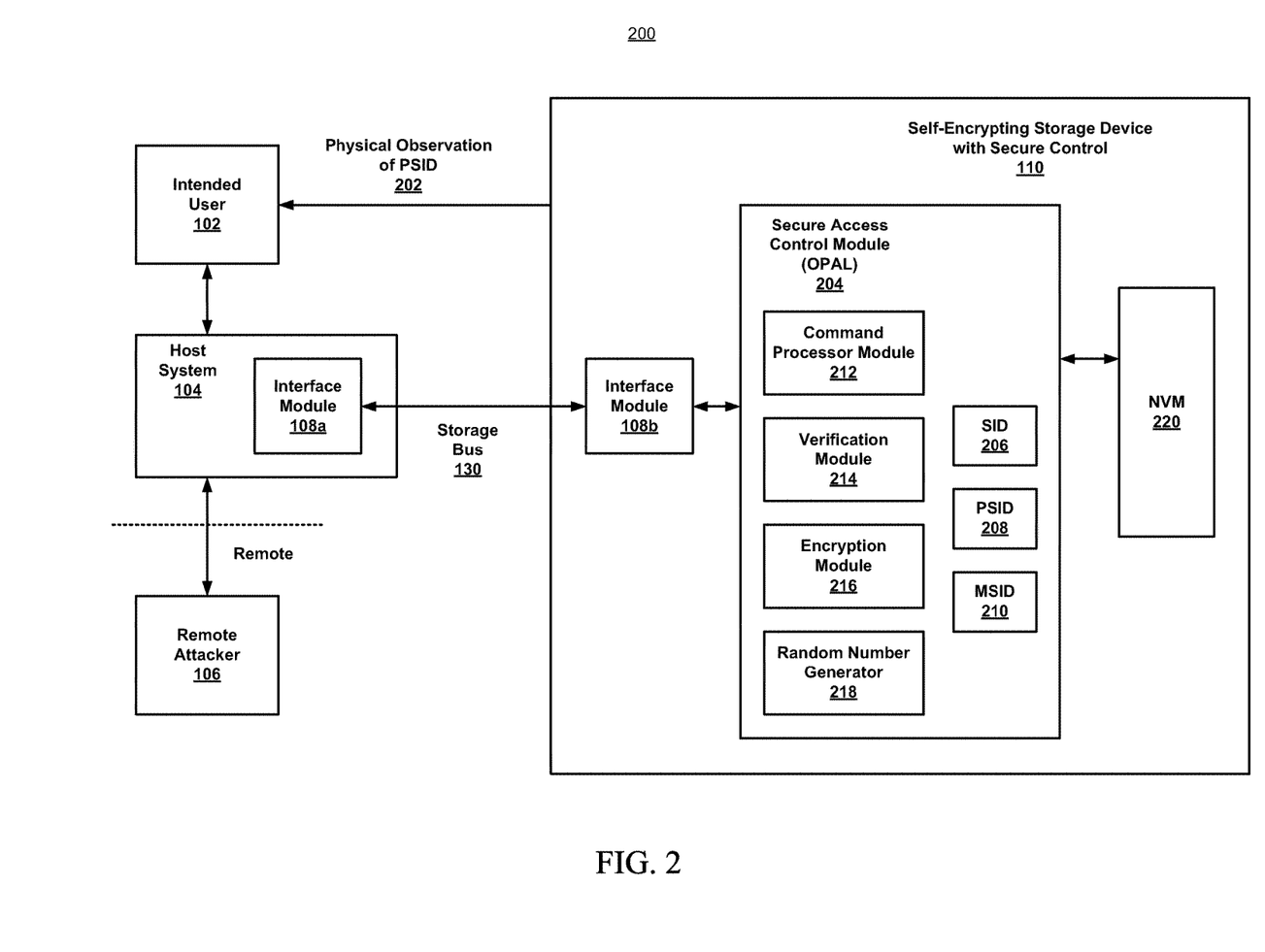
FIG. 2 illustrates a block diagram of one example embodiment consistent with the present disclosure.

FIG. 2 illustrates a block diagram 200 of one example embodiment consistent with the present disclosure. The storage device 110 is shown to include a secure access control module 204, a storage device side interface module 108b and an NVM 220.

The storage device 110 and/or the secure access control module 204 may be configured to implement, comply with, or otherwise be compatible with the Opal Storage Specification: "TCG Storage Security Subsystem Class: Opal," Specification Version 1.00, Feb. 4, 2010 of the Trusted Computing Group (TCG), including current, previous and future versions of that specification. The storage device 110 may also be referred to as a "Trusted Peripheral" in Opal terminology. Although operations will be described here in the context of Opal, it will be appreciated that these techniques may be applied to other similarly purposed storage device security systems.

The secure access control module 204 is shown to include a command processor module 212, a verification module 214, an encryption module 216, a random number generator 218 and storage for a Security Identifier (SID) 206, PSID 208 and a Manufacturer Security Identifier (MSID) 210.

The command processor module 212 may be configured to receive requests from a user or host system including a request to enable or disable the secure access control features of the NVM 220. Any required encryption or decryption of one or more portions (e.g., address ranges) of the NVM 220 may be performed by encryption module 216 as appropriate. The command processor module 212 may also be configured to receive the associated verification credentials (SID, PSID, etc.) that may be required from the user for these operations. Verification module 214 may be configured to perform the verification operations, as will be described below, to verify the credentials and physical presence of the user.

In some embodiments, a software application is provided by the manufacturer or an independent software vendor to send the appropriate configuration commands as specified in the TCG Opal spec to the storage device. In an embodiment, the software application issues a sequence of commands, called methods in the TCG specifications, to perform configuration and provisioning operations. Prior to initiating a session, the software application invokes the Level 0 discovery command and Properties method to determine the capabilities of the secure access control module 204 (e.g., the OPAL security subsystem).

The StartSession method is used by the software application to initiate a communications session between the host system 104 and the storage device 110. This method can also pass a credential, such as the PSID or SID, to the storage device for authentication. The storage device is configured to authenticate the credential and responds with success if the credential is successfully authenticated.

After successful authentication of the SID credential and initiation of a session, the software application invokes the Activate method, which is used to activate the locking and encryption management functionality supplied by the Opal subsystem in the storage device. The session is then ended by the software application.

Once locking and encryption management have been activated, the software application invokes StartSession to initiate a new session and authenticate an Admins credential, in order to satisfy access control requirements necessary to perform configuration and provisioning operations, such as setting User passwords and access controls.

The software application invokes the Get method in a session, in order to retrieve metadata from tables in the subsystem, which are data structures employed to store configurations and metadata. The software application invokes the Set method in a session to configure Users and Admins passwords, and configure the device to lock when the device power cycles.

The MSID 210 is an identifier, for example an alphanumeric value, which is used as a default credential for the storage device. The MSID 210 is encoded or otherwise stored in a reserved location in non-volatile memory that is outside of the region of encrypted data of the non-volatile memory of the storage device 110. The MSID is accessed by a user/host system through the interface 108 through an appropriate set of commands. Generally, the MSID, once set by the manufacturer, cannot be changed by the user.

The SID 206 is a security identifier, for example an alphanumeric value, or credential that is associated with the owner or legitimate user of the storage device 110. The SID 206 is typically initialized by the manufacturer to a default value that is set to the MSID 210 and can subsequently be changed by the user to enforce access controls on the device 110. The SID 206 can also be stored in a non-volatile memory of the storage device, for example, outside of the region of encrypted data.

The PSID 208 is a physical security identifier, for example an alphanumeric value, or credential that is associated with and unique to the storage device 110. In an embodiment, the PSID 208 can be generated by the manufacturer and stored in a non-volatile memory of the storage device that is inaccessible through the interface 108. In other words, the PSID 208 cannot be read or otherwise discovered by any entity external to the device 110 through any electronic method. The PSID 208 can, however, be printed on a label attached to the device 110, or otherwise made available, for example through some visual method, to a user located in physical proximity to the device 110. In some embodiments, the PSID is printed or otherwise visually accessible on the housing of the storage device 110 or on a housing of a system within which storage device 100 is incorporated. A remote attacker 106 can therefore be prevented from obtaining the PSID 208. The PSID is thus used to verify a physical presence of the device owner or legitimate user 102, for example prior to enablement of the self-encryption feature.

It will be appreciated that the term "physical presence" does not necessarily require that the intended or legitimate user 102 need always be locally present in the proximity of the storage device 110. For example, physical presence may indicate a one-time presence by the user 102 to visually obtain the PSID which may later be used during a verification process from a remote location.

Figure 3:
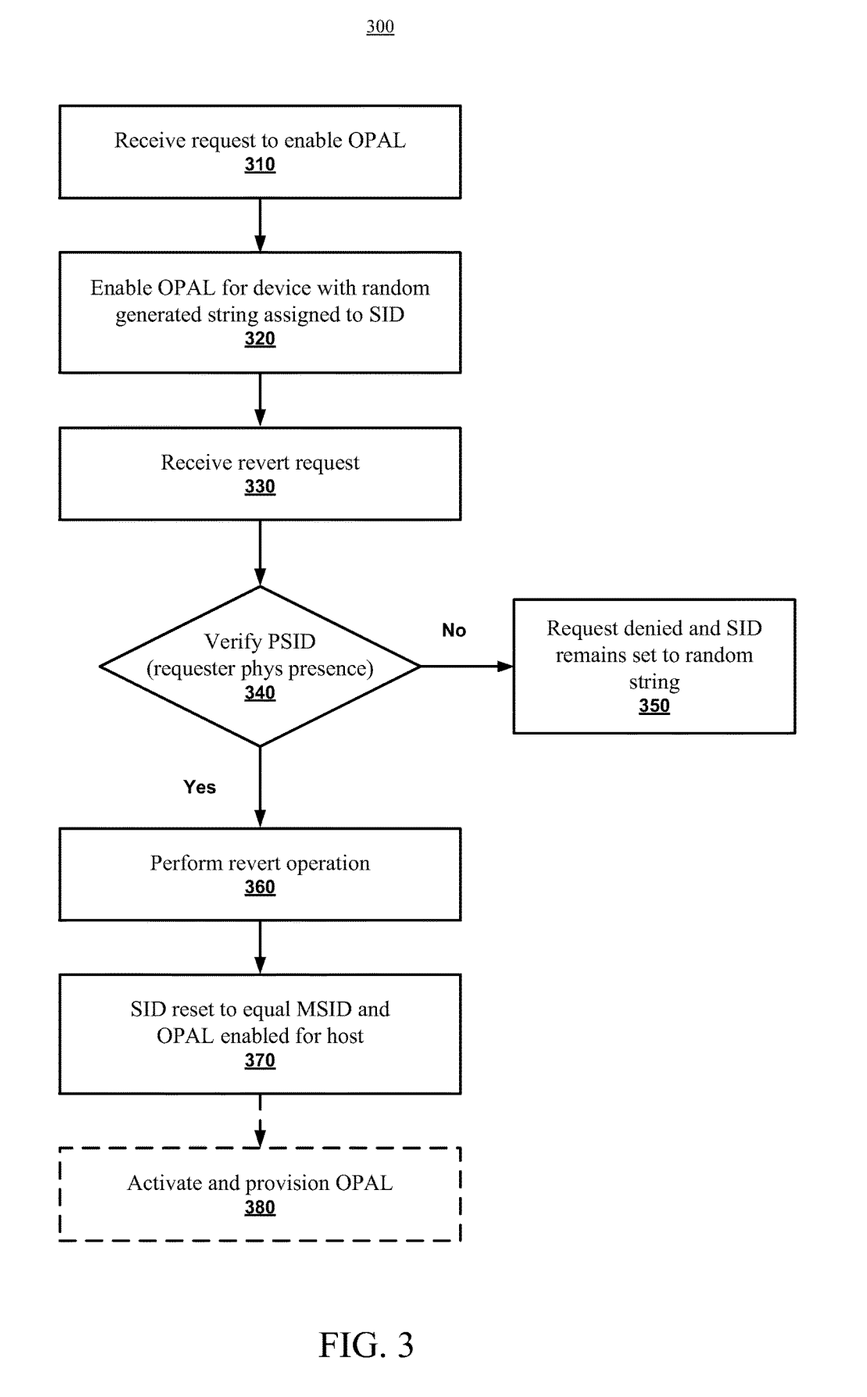
FIG. 3 illustrates a flowchart of operations of one example embodiment consistent with the present disclosure.

FIG. 3 illustrates a flowchart of operations 300 of another example embodiment consistent with the present disclosure. The operations provide a method for secure enablement and activation of access controls on a self-encrypting storage device. At operation 310, a request is received to enable self-encryption (e.g., as implemented through Opal). At operation 320, Opal is enabled for the device and a random number or string (generated for example by random number generator 218) is assigned to the SID for the device, which will no longer be the same as the MSID. This may prevent any further attempts to alter access control settings until the current operation is successfully completed (e.g., by the intended user 102). The random number generator 218 may implement a non-deterministic random number generation algorithm to reduce the probability that a remote attacker might predict the random number value.

At operation 330, a request is received for a revert operation, via the TCG Opal Revert method. The requester's physical presence is verified at operation 340, by supplying a valid PSID associated with the device, via a TCG method such as StartSession or Authenticate. Because access to the PSID is limited to visual observation of some portion of the device, such as a printed label as described previously, knowledge of the PSID may be used to verify the physical presence of the requester. If the verification fails, then at operation 350 the Revert method invocation will subsequently be denied and the SID remains set to the random value. In some embodiments, an alert may be generated to log the event and/or notify the legitimate user (e.g., intended user 102) of a failed attempt to enable access controls (Opal).

If the verification succeeds, however, then at operation 360 the revert operation is performed. At operation 370, as part of the revert, the SID is reset back to the MSID associated with the device and Opal is left in an enabled state. At this point the user may optionally, activate and provision Opal, at operation 380, for example through the Activate method executed by the software application.

Figure 4:
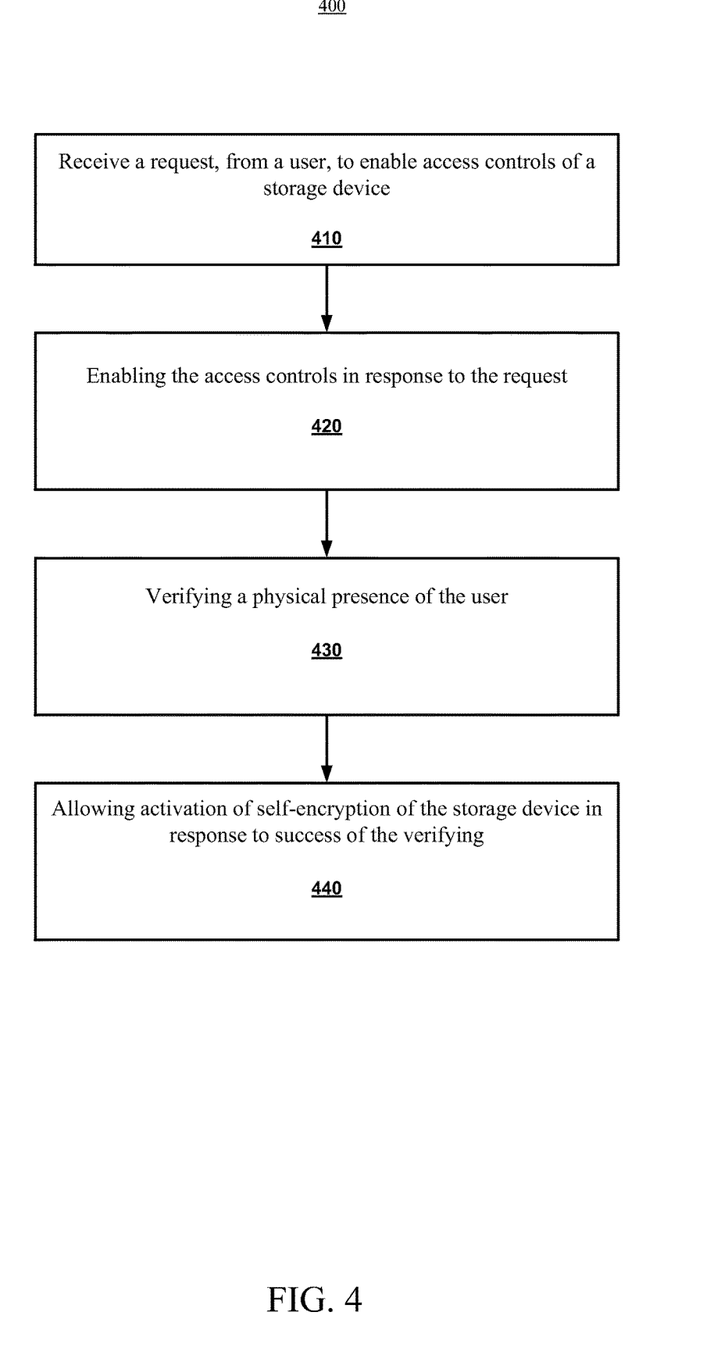
FIG. 4 illustrates a flowchart of operations of another example embodiment consistent with the present disclosure.

FIG. 4 illustrates a flowchart of operations 400 of another example embodiment consistent with the present disclosure. The operations provide a method for secure control of access control enablement and activation on a self-encrypting storage device. At operation 410, a request is received to enable access controls of the storage device. The request is received from a user of a host system of the storage device, for example through a software application that requests the storage device to enable OPAL security by sending an appropriate sequence of commands. The StartSession method is used to initiate a communications session and authenticate the SID credential. The Activate method is used to activate the locking functionality provided by the Opal subsystem implemented in the storage device. At operation 420, access controls (e.g., OPAL security) are enabled in response to the request. At operation 430, the physical presence of the user is verified, for example by supplying a valid PSID associated with the device as printed on the storage device label. The software application may be configured to prompt the user to enter the PSID. The user may then enter the PSID through the software application. The software application may send the PSID to the storage device, for example by using the StartSession method or using the Authenticate method in a session that has already been initiated. The storage device verifies the submitted PSID and responds with the verification result. Because access to the PSID is limited to visual observation of some portion of the device, such as a printed label as described previously, knowledge of the PSID may be used to verify the physical presence of the requester. At operation 440, if the physical presence verification succeeds, the software application invokes the "Revert" command which resets the SID to MSID and activation of self-encryption of the storage device is then possible, via execution of the Activate method. If the physical presence verification fails, access controls (e.g., OPAL security) may remain in their existing state and the SID remains set to the random value.

Figure 5:
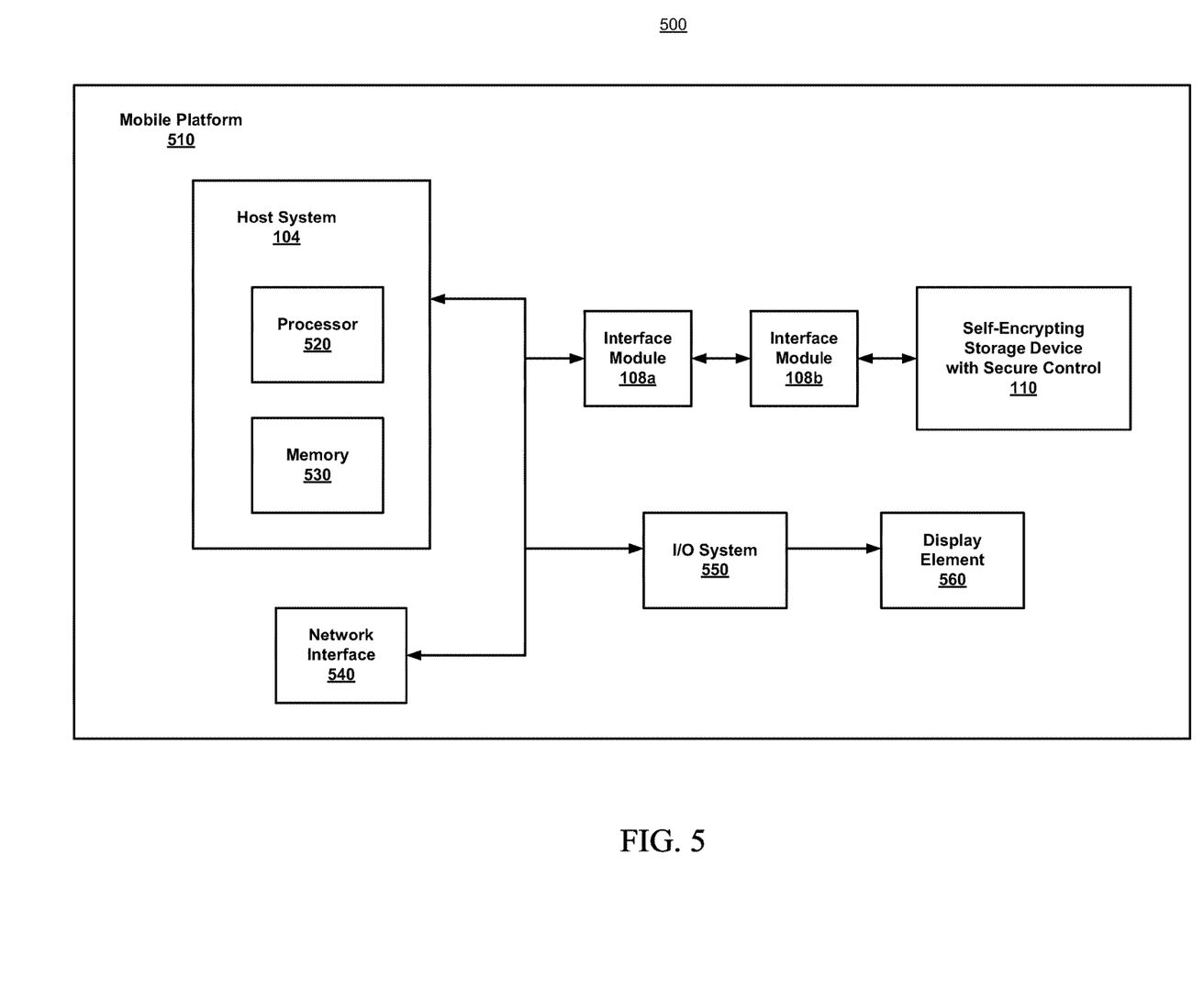
FIG. 5 illustrates a system diagram of a platform of another example embodiment consistent with the present disclosure.

FIG. 5 illustrates a system diagram 500 of one example embodiment consistent with the present disclosure. The system 500 may be a mobile platform 510 or computing device such as, for example, a smart phone, smart tablet, personal digital assistant (PDA), mobile Internet device (MID), convertible tablet, notebook or laptop computer, or any other suitable device. It will be appreciated, however, that embodiments of the system described herein are not limited to mobile platforms, and in some embodiments, the system 500 may be a workstation or desktop computer. The device may generally present various interfaces to a user via a display element 560 such as, for example, a touch screen, liquid crystal display (LCD) or any other suitable display type.

The system 500 is shown to include a host system 104 that may further include any number of processors 520 and memory modules 530. In some embodiments, the processors 520 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The memory 530 may be coupled to the processors. The memory 530 may be any of a wide variety of memories (including various layers of memory hierarchy and/or memory caches) as are known or otherwise available to those of skill in the art. It will be appreciated that the processors and memory may be configured to store, host and/or execute one or more user applications or other software modules. These applications may include, but not be limited to, for example, any type of computation, communication, data management, data storage and/or user interface task. In some embodiments, these applications may employ or interact with any other components of the mobile platform 510.

System 500 is also shown to include network interface module 540 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

System 500 is also shown to include an input/output (IO) system or controller 550 which may be configured to enable or manage data communication between processor 520 and other elements of system 500 or other elements (not shown) external to system 500.

System 500 is also shown to include a self-encrypting storage device with secure control 110, as described previously. Storage device 110 may further include a secure access control module (e.g., Opal) and an NVM as illustrated in FIG. 2. Interface modules 108*a*, 108*b* may also be provided to couple the storage device 110 to the host system 104 over a storage bus.

It will be appreciated that in some embodiments, the various components of the system 500 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An application or "app" may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for secure control of access control enablement and activation on self-encrypting storage devices. The following examples pertain to further embodiments.

According to Example 1 there is provided a storage device. The device may include a non-volatile memory (NVM) and a secure access control module. The secure access control module of this example may include a command processor module to receive a request to enable access controls of the NVM, from a user, and to enable the access controls; a verification module to verify a physical presence of the user; and an encryption module to allow encryption of at least a portion of the NVM in response to an indication of success from the verification module.

Example 2 may include the subject matter of Example 1, and the secure access control module implements Opal Storage Specification access controls.

Example 3 may include the subject matter of Examples 1 and 2, further including a random number generator to generate a random number and update a Security Identifier (SID) associated with the access controls to the random number.

Example 4 may include the subject matter of Examples 1-3, and the verification of the physical presence of the user is based on receiving a Physical Security Identifier (PSID) from the user, the PSID associated with the storage device.

Example 5 may include the subject matter of Examples 1-4, and the PSID is displayed on a housing of the storage device.

Example 6 may include the subject matter of Examples 1-5, and the PSID is provided in a visually observable manner in association with the storage device.

Example 7 may include the subject matter of Examples 1-6, and the secure access control module is further to perform a revert operation of the storage device, if the verification of the physical presence is successful.

Example 8 may include the subject matter of Examples 1-7, and the revert operation restores the SID to a Manufacturer Security Identifier (MSID).

Example 9 may include the subject matter of Examples 1-8, and the secure access control module is further to allow configuration of the access controls of the NVM if the verification of the physical presence is successful.

Example 10 may include the subject matter of Examples 1-9, and the NVM is a solid state drive (SSD).

Example 11 may include the subject matter of Examples 1-10, and the secure access control module is further to communicate with a host system through an interface module and a storage bus, the interface module to implement one of a Serial Advanced Technology Attachment (SATA) interface, a Serial Attached Small Computer System (SAS) Interface, a Peripheral Component Interconnect Express (PCIe) interface, a Universal Flash Storage (UFS) interface and/or an embedded Multimedia Controller interface (eMMC).

According to Example 12 there is provided a method for secure control of a storage device. The method may include receiving a request, from a user, to enable access controls of an NVM; enabling the access controls in response to the request; verifying a physical presence of the user; and allowing activation of self-encryption of the NVM in response to success of the verifying.

Example 13 may include the subject matter of Example 12, and the storage device implements Opal Storage Specification access controls.

Example 14 may include the subject matter of Examples 12 and 13, and the enabling of the access controls further includes generating a random number and updating a Security Identifier (SID) associated with the access controls to the random number.

Example 15 may include the subject matter of Examples 12-14, and the verifying of the physical presence of the user further includes receiving a Physical Security Identifier (PSID) from the user, the PSID associated with the storage device.

Example 16 may include the subject matter of Examples 12-15, and the PSID is displayed on a housing of the storage device.

Example 17 may include the subject matter of Examples 12-16, and the PSID is provided in a visually observable manner in association with the storage device.

Example 18 may include the subject matter of Examples 12-17, further including performing a revert operation of the storage device, in response to success of the verifying.

Example 19 may include the subject matter of Examples 12-18, and the revert operation further includes restoring the SID to a Manufacturer Security Identifier (MSID).

Example 20 may include the subject matter of Examples 12-19, further including allowing configuration of the access controls of the NVM in response to success of the verifying.

According to Example 21 there is provided a mobile platform. The mobile platform may include a processor; a display element coupled to the processor; and an SSD storage device coupled to the processor. The SSD of this example may include a non-volatile memory (NVM) and a secure access control module. The secure access control module of this example may include a command processor module to enable access controls of the NVM in response to a request from the processor; a verification module to verify a physical presence of a user; and an encryption module to allow encryption of at least a portion of the NVM in response to an indication of success from the verification module.

Example 22 may include the subject matter of Example 21, and the secure access control module implements Opal Storage Specification access controls.

Example 23 may include the subject matter of Examples 21-22, and the verification of the physical presence of the user is based on receiving a Physical Security Identifier (PSID) from the user, the PSID associated with the storage device.

Example 24 may include the subject matter of Examples 21-23, and the PSID is displayed on a housing of the storage device.

Example 25 may include the subject matter of Examples 21-24, and the secure access control module is further to perform a revert operation of the storage device, if the verification of the physical presence is successful.

Example 26 may include the subject matter of Examples 21-25, and the revert operation restores the SID to a Manufacturer Security Identifier (MSID).

Example 27 may include the subject matter of Examples 21-26, and the secure access control module is further to allow configuration of the access controls of the NVM if the verification of the physical presence is successful.

Example 28 may include the subject matter of Examples 21-27, and the secure access control module is further to communicate with a host system through an interface module and a storage bus, the interface module to implement one of a Serial Advanced Technology Attachment (SATA) interface, a Serial Attached Small Computer System (SAS) Interface, a Peripheral Component Interconnect Express (PCIe) interface, a Universal Flash Storage (UFS) interface and/or an embedded Multimedia Controller interface (eMMC).

Example 29 may include the subject matter of Examples 21-28, and the mobile platform is a smart phone, smart tablet, notebook or laptop computer.

According to Example 30 there is provided at least one computer-readable storage medium having instructions stored thereon which when executed by a processor result in the following operations for secure control of a storage device. The operations may include receiving a request, from a user, to enable access controls of an NVM; enabling the access controls in response to the request; verifying a physical presence of the user; and allowing activation of self-encryption of the NVM in response to success of the verifying.

Example 31 may include the subject matter of Example 30, and the storage device implements Opal Storage Specification access controls.

Example 32 may include the subject matter of Examples 30 and 31, and the enabling of the access controls further includes the operations of generating a random number and updating a Security Identifier (SID) associated with the access controls to the random number.

Example 33 may include the subject matter of Examples 30-32, and the verifying of the physical presence of the user further includes the operation of receiving a Physical Security Identifier (PSID) from the user, the PSID associated with the storage device.

Example 34 may include the subject matter of Examples 30-33, and the PSID is displayed on a housing of the storage device.

Example 35 may include the subject matter of Examples 30-34, and the PSID is provided in a visually observable manner in association with the storage device.

Example 36 may include the subject matter of Examples 30-35, further including the operation of performing a revert operation of the storage device, in response to success of the verifying.

Example 37 may include the subject matter of Examples 30-36, and the revert operation further includes the operation of restoring the SID to a Manufacturer Security Identifier (MSID).

Example 38 may include the subject matter of Examples 30-37, further including allowing configuration of the access controls of the NVM in response to success of the verifying.

According to Example 39 there is provided a system for secure control of a storage device. The system may include means for receiving a request, from a user, to enable access controls of an NVM; means for enabling the access controls in response to the request; means for verifying a physical presence of the user; and means for allowing activation of self-encryption of the NVM in response to success of the verifying.

Example 40 may include the subject matter of Example 39, and the storage device implements Opal Storage Specification access controls.

Example 41 may include the subject matter of Examples 39 and 40, and the enabling of the access controls further includes means for generating a random number and updating a Security Identifier (SID) associated with the access controls to the random number.

Example 42 may include the subject matter of Examples 39-41, and the verifying of the physical presence of the user further includes means for receiving a Physical Security Identifier (PSID) from the user, the PSID associated with the storage device.

Example 43 may include the subject matter of Examples 39-42, and the PSID is displayed on a housing of the storage device.

Example 44 may include the subject matter of Examples 39-43, and the PSID is provided in a visually observable manner in association with the storage device.

Example 45 may include the subject matter of Examples 39-44, further including means for performing a revert operation of the storage device, in response to success of the verifying.

Example 46 may include the subject matter of Examples 39-45, and the revert operation further includes means for restoring the SID to a Manufacturer Security Identifier (MSID).

Example 47 may include the subject matter of Examples 39-46, further including means for allowing configuration of the access controls of the NVM in response to success of the verifying.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A storage device comprising:
   a non-volatile memory (NVM); and
   secure access control circuitry configured to:
   store a Manufacturer Security Identifier (MSID) having a MSID value;
   store a Security Identifier (SID) having an SID value, wherein said SID value is initially equal to said MSID value;
   receive a request to enable access controls of said NVM, from a user, and to enable said access controls;
   in response to said request to enable said access controls, change said SID value to a randomly generated value; and
   verify a physical presence of said user using a Physical Security Identifier (PSID), wherein:
      when said verification is successful, said SID value is restored to said MSID value and at least a portion of said NVM is capable of encryption; and
      when said verification is not successful, said SID value remains said randomly generated value and said request to enable said access controls is denied.

2. The storage device of claim 1, wherein said secure access control circuitry implements Opal Storage Specification access controls.

3. The storage device of claim 1, further comprising a random number generator to generate said randomly generated value.

4. The storage device of claim 1, wherein said PSID is associated with said storage device.

5. The storage device of claim 4, wherein said PSID is displayed on a housing of said storage device.

6. The storage device of claim 1, wherein said secure access control circuitry configures said access controls of said NVM if said verification of said physical presence is successful.

7. The storage device of claim 1, wherein said NVM is a solid state drive (SSD).

8. The storage device of claim 1, wherein said secure access control circuitry communicates with a host system through an interface module and a storage bus, said interface module to implement one of a Serial Advanced Technology Attachment (SATA) interface, a Serial Attached Small Computer System (SAS) Interface, a Peripheral Component Interconnect Express (PCIe) interface, a Universal Flash Storage (UFS) interface or an embedded Multimedia Controller interface (eMMC).

9. A method for secure control of a storage device, said method comprising:
   receiving a request, from a user, to enable access controls of a non-volatile memory (NVM) of said storage device;
   in response to said request to enable said access controls, changing a Security Identifier (SID) associated with said storage device to a randomly generated value and enabling said access controls;
   verifying a physical presence of said user using a Physical Security Identifier (PSID);
   when said verification is successful, restoring said SID to a Manufacturer Security Identifier (MSID) and encrypting at least a portion of said NVM;
   when said verification is not successful, said SID retains said randomly generated value and said request to enable said access controls is denied.

10. The method of claim 9, wherein said storage device implements Opal Storage Specification access controls.

11. The method of claim 9, wherein said PSID is displayed on a housing of said storage device.

12. The method of claim 9, further comprising allowing configuration of said access controls of said NVM in response to success of said verifying.

13. A mobile platform comprising:
   a processor;
   a display element coupled to said processor; and
   a solid state drive (SSD) storage device coupled to said processor, said SSD comprising:
   a non-volatile memory (NVM); and
   secure access control circuitry configured to:
      store a Manufacturer Security Identifier (MSID) having a MSID value;
      store a Security Identifier (SID) having an SID value, wherein said SID value is initially equal to said MSID value;
      enable access controls of said NVM in response to a request from said processor;
      in response to said request to enable said access controls, change said SID value to a randomly generated value; and
      verify a physical presence of a user using a Physical Security Identifier (PSID), wherein:
         when said verification is successful, said SID value is restored to said MSID value and at least a portion of said NVM is capable of encryption; and
         when said verification is not successful said SID value remains said randomly generated value and said request to enable said access controls is denied.

14. The mobile platform of claim 13, wherein said secure access control circuitry implements Opal Storage Specification access controls.

15. The mobile platform of claim 13, wherein said PSID is associated with said storage device.

16. The mobile platform of claim 15, wherein said PSID is displayed on a housing of said storage device.

17. The mobile platform of claim 13, wherein said secure access control circuitry configures said access controls of said NVM if said verification of said physical presence is successful.

18. The mobile platform of claim 13, wherein said secure access control circuitry communicates with said processor through an interface module and a storage bus, said interface module to implement one of a Serial Advanced Technology Attachment (SATA) interface, a Serial Attached Small Computer System (SAS) Interface, a Peripheral Component Interconnect Express (PCIe) interface, a Universal Flash Storage (UFS) interface or an embedded Multimedia Controller interface (eMMC).

19. The mobile platform of claim 13, wherein said mobile platform is a smart phone, smart tablet, notebook or laptop computer.

* * * * *